UNITED STATES PATENT OFFICE.

CHARLES GRATH, OF ST. LOUIS, MISSOURI.

IMPROVED COMPOSITION FOR LUBRICATING.

Specification forming part of Letters Patent No. 40,835, dated December 8, 1863.

*To all whom it may concern:*

Be it known that I, CHARLES GRATH, of St. Louis, in the county of St. Louis and State of Missouri, have invented a new and Improved Mode of Manufacturing Axle and Machine Grease; and I hereby declare that the following is a full and exact description thereof.

The nature of my invention consists in the combination of paraffine-oil (lubricating coal-oil) with greasy substances, rosin, and a lye produced by a solution of lime, alum, soda, potassa, and sugar of lead in water.

To enable others skilled in the art to make and use my invention, I hereby describe its production.

To make about one hundred pounds of my axle and machine grease, I take six gallons of paraffine-oil, heat it until boiling, (sample No. 1,) and dissolve in it a quantity of from eight to ten pounds of rosin. If the oil is not rich or greasy enough, I add to it the necessary quantity of greasy substances, such as lard, tallow, wax, &c. After all these substances are sufficiently dissolved and mixed I let the whole cool off entirely. At the same time I make a lye by taking about six gallons of water and mixing in it three pounds of lime, add to it from two and one-half to four ounces of soda, two and one-half ounces of alum, one and one-half ounce of potassa, and one and one-half ounce of sugar of lead. After these substances are mixed well in the water and entirely dissolved I let the lye rest for about twenty-four hours. I here annex samples of soda, (marked "No. 2,") alum, (marked "No. 3,") potassa, (marked "No. 4,") and sugar of lead, (marked "No. 5.") I then take the cooled oil and the lye, put it together in a tub, and stir the whole until it is mixed well and has got the necessary stiffness by saponifying. By adding more or less of the lye or rosin I make it more liquid or more solid, according to the grease desired. If finished with that part of the work, I add about one gallon more of paraffine-oil to it, mix it well, and then my axle and machine grease is finished.

The particular properties of my axle and machine grease in comparison to similar preparations are the following: First, my grease, when used, does not gum up like other grease used hitherto; second, my grease is not affected by any temperature or climate, and does neither melt nor freeze; third, in using a smaller quantity is required than from any other grease that has been used hitherto for such purpose.

I do not claim the use of paraffine-oil nor of the rosin as my particular invention; but

I claim as my invention—

The production of an axle or machine grease made from paraffine-oil, with the combination of the substances above specified.

CHARLES GRATH.

Witnesses:
C. C. HARTMAN,
S. R. MENDEL.